(12) United States Patent
Miyata et al.

(10) Patent No.: US 8,315,505 B2
(45) Date of Patent: Nov. 20, 2012

(54) SIGNAL DISCRIMINATING DEVICE, SIGNAL PROCESSING DEVICE, IMAGE DISPLAY DEVICE, AND REPRODUCING DEVICE

(75) Inventors: Koji Miyata, Tokyo (JP); Nobuyuki Sudou, Tokyo (JP)

(73) Assignee: Sony Corporation (JP)

( * ) Notice: Subject to any disclaimer, the term of this patent is extended or adjusted under 35 U.S.C. 154(b) by 790 days.

(21) Appl. No.: 12/454,041

(22) Filed: May 12, 2009

(65) Prior Publication Data
US 2009/0297114 A1 Dec. 3, 2009

(30) Foreign Application Priority Data
May 14, 2008 (JP) ................. P2008-127006

(51) Int. Cl.
*H04N 9/80* (2006.01)
(52) U.S. Cl. ............ 386/248; 386/249; 386/255
(58) Field of Classification Search ........... 386/239
See application file for complete search history.

(56) References Cited

U.S. PATENT DOCUMENTS 5,671,018 A * 9/1997 Ohara et al. ........... 348/452
7,283,174 B2 * 10/2007 Tokuhara et al. ....... 348/448
7,729,563 B2 * 6/2010 Kameyama et al. ..... 382/299
2005/0018767 A1 1/2005 Lee

FOREIGN PATENT DOCUMENTS

JP 2002-330311 A 11/2002
JP 2005-045807 A 2/2005

* cited by examiner

*Primary Examiner* — Jamie Atala
(74) *Attorney, Agent, or Firm* — Lerner, David, Littenberg, Krumholz & Mentlik, LLP

(57) ABSTRACT

The present invention is directed to provide a signal discriminating device realizing signal discrimination which enables a more appropriate signal process to be performed according to a signal source and a state of an input video signal. The signal discriminating device includes: a comparing section comparing a motion magnitude between two fields of an input video signal with one or more predetermined motion magnitude patterns which are provided in correspondence with one or more signal sources, so as to determine one or more degrees of match or mismatch between the motion magnitude and the motion magnitude patterns; and a discriminating section discriminating a signal source of the input video signal in consideration of the degree of certainty or uncertainty of discrimination, the degree of certainty or uncertainty being determined on the basis of the degrees of match or mismatch determined in the comparing section.

12 Claims, 9 Drawing Sheets

$\begin{cases} A(i+1) : X(v), X(v+1), X(v+2), X(v+3), X(v+4), X(v+5), X(v+6), X(v+7), X(v+8), X(v+9) \\ B(i+1) : Y(v), Y(v+1), Y(v+2), Y(v+3), Y(v+4), Y(v+5), Y(v+6), Y(v+7), Y(v+8), Y(v+9) \end{cases}$

FIG. 8

SIGNAL DISCRIMINATING DEVICE, SIGNAL PROCESSING DEVICE, IMAGE DISPLAY DEVICE, AND REPRODUCING DEVICE

The present application claims priority from Japanese Patent Application No. JP 2008-127006 filed in the Japanese Patent Office on May 14, 2008, the entire content of which is incorporated herein by reference.

BACKGROUND OF THE INVENTION

1. Field of the Invention

The present invention relates to a signal discriminating device for discriminating a signal source and a state of an input video signal, a signal processing device having the signal discriminating device, and an image display device and a reproducing device each having such a signal processing device.

2. Description of the Related Art

Hitherto, in an image display device using a video signal, various image processes such as sharpness process and I/P converting process are performed on a video signal supplied (input video signal) in order to improve the picture quality.

For the input video signals, various signal sources such as a 2-3 film source and a 2-2 film source exist. Consequently, various methods for discriminating the signal source of such an input video signal have been conventionally proposed, and a signal process (image process) according to the discriminated signal source is performed (for example, Japanese Unexamined Patent Application Publication Nos. 2002-330311 and 2005-45807).

SUMMARY OF THE INVENTION

In the conventional methods of the above-described patent application publications, the signal source of an input video signal is discriminated as, for example, a "2-3 film source" or a "2-2 film source". Therefore, since the flexibility in discrimination of a signal source is low, a proper signal process according to a signal source is not always performed, and there is room for improvement.

Such a problem occurs not only at the time of discriminating the signal source of an input video signal but similarly occurs also at the time of, for example, discriminating the state of an input video signal (either a still image or a moving image, or the state of brightness or the like).

It is therefore desirable to provide a signal discriminating device realizing signal discrimination enabling a more appropriate signal process according to a signal source and a state of an input video signal to be performed, a signal processing device having such a signal discriminating device, and an image display device and a reproducing device each having such a signal processing device.

A first signal discriminating device as an embodiment of the present invention includes: a comparing section comparing a motion magnitude between two fields of an input video signal with one or more predetermined motion magnitude patterns which are provided in correspondence with one or more signal sources, so as to determine one or more degrees of match or mismatch between the motion magnitude and the motion magnitude patterns; and a discriminating section discriminating a signal source of the input video signal in consideration of the degree of certainty or uncertainty of discrimination, the degree of certainty or uncertainty being determined on the basis of the degrees of match or mismatch determined in the comparing section.

A signal processing device as an embodiment of the invention includes the comparing section, the discriminating section, and an image processing section performing predetermined image process on the input video signal. The image processing section changes an image process level on the input video signal in accordance with a result of discrimination of the signal source of the input video signal by the discriminating section.

An image display device as an embodiment of the invention includes: the comparing section, the discriminating section, the image processing section, and a display section displaying an image on the basis of a video signal subjected to the image process by the image processing section.

A reproducing device as an embodiment of the invention includes: a reproducing section reproducing a video signal recorded on a predetermined recording medium; a comparing section comparing a motion magnitude between two fields of an input video signal with one or more predetermined motion magnitude patterns which are provided for one or more signal sources, so as to determine one or more degrees of match or mismatch between the motion magnitude and the motion magnitude patterns, the input video signal being reproduced by the reproducing section; the discriminating section; and the image processing section.

In the first signal discriminating device, the signal processing device, the image display device, and the reproducing device as embodiments of the present invention, a motion magnitude between two fields of an input video signal is compared with one or more predetermined motion magnitude patterns which are provided in correspondence with one or more signal sources, so as to determine one or more degrees of match or mismatch between the motion magnitude and the motion magnitude patterns. On the basis of the degrees of match or mismatch, the signal source of the input video signal is discriminated in consideration of the degree of certainty or uncertainty of discrimination. Thus, the flexibility in discrimination of the signal source of the input video signal becomes higher than that in the techniques of related art.

A second signal discriminating device as an embodiment of the invention includes: a comparing section comparing a parameter obtained from signals which are different from each other in time or space in input video signal with one or more predetermined patterns which are provided for the parameter, so as to determine one or more degrees of match or mismatch between the parameter obtained from the input video signal and the predetermined patterns; and a discriminating section discriminating state of the input video signal in consideration of the degree of certainty or uncertainty of discrimination, the degree of certainty or uncertainty being determined on the basis of the degrees of match or mismatch determined in the comparing section.

In the second signal discriminating device as an embodiment of the invention, a parameter obtained from signals which are different from each other in time or space in input video signal is compared with one or more predetermined patterns which are provided for the parameter, so as to determine one or more degrees of match or mismatch between the parameter obtained from the input video signal and the predetermined patterns. On the basis of the degree of match or mismatch, the state of the input video signal is discriminated in consideration of the degree of certainty or uncertainty of discrimination. Thus, the flexibility in discrimination of the state of the input video signal becomes higher than that in the techniques of related art.

In the first signal discriminating device, the signal processing device, the image display device, and the reproducing device as embodiments of the present invention, one or more degrees of match or mismatch between the motion magnitude between two fields of an input video signal and the motion magnitude patterns is obtained and, on the basis of the degrees of match or mismatch, the signal source of the input video signal is discriminated in consideration of the degree of certainty or uncertainty of discrimination. Thus, the flexibility in discrimination of the signal source of the input video signal becomes higher than that in the techniques of related art. Therefore, signal discrimination capable of performing more appropriate signal process according to the signal source of the input video signal is realized.

In the second signal discriminating device as an embodiment of the present invention, the state of an input video signal is discriminated on the basis of one or more degrees of match or mismatch between a parameter obtained from signals which are different from each other in time or space in input video signal and predetermined patterns which are provided for the parameter in consideration of the degree of certainty or uncertainty of discrimination. Thus, the flexibility in discriminating the state of the signal source of the input video signal becomes higher than that in the techniques of related art. Therefore, signal discrimination capable of performing more appropriate signal process according to the state of the input video signal is realized.

Other and further objects, features and advantages of the invention will appear more fully from the following description.

BRIEF DESCRIPTION OF THE DRAWINGS

FIG. 8 is a flowchart showing an example of the data structure of a parameter in a data storage applied at the time of performing the pre-process illustrated in FIG. 7.

DETAILED DESCRIPTION OF THE PREFERRED EMBODIMENTS

Embodiments of the present invention will be described in detail hereinbelow with reference to the drawings.

Figure 1:
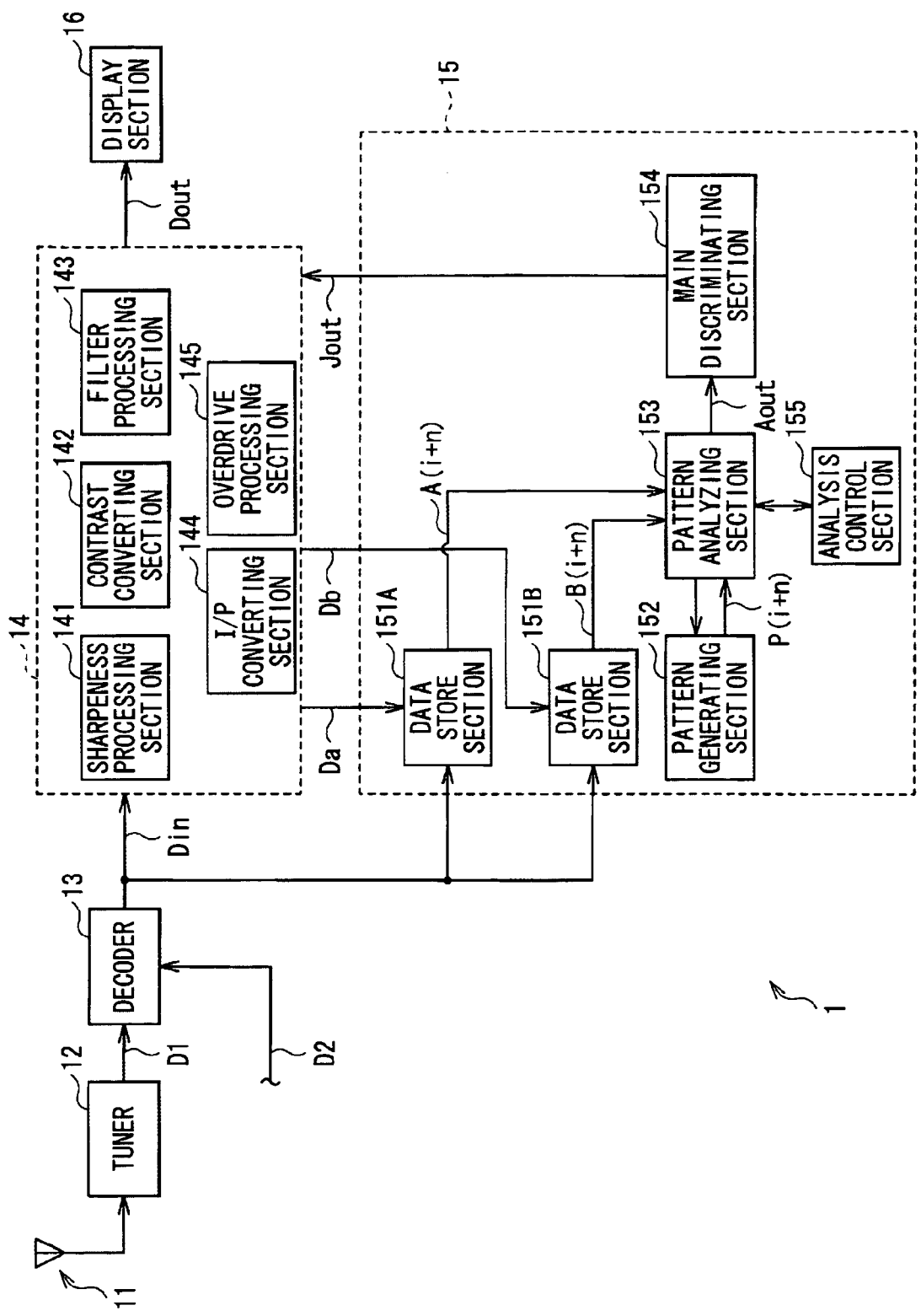
FIG. 1 is a block diagram showing a general configuration of an image display device as an embodiment of the present invention.

FIG. 1 shows a general configuration of an image display device (TV (TeleVision) device 1) as an embodiment of the present invention. The TV device 1 has an antenna 11, a tuner 12, a decoder 13, an image processing section 14, a signal discriminating device (signal discriminating section 15) as an embodiment of the present invention, and a display section 16. The image processing section 14 and the signal discriminating section 15 correspond to a signal processing device as an embodiment of the present invention.

The antenna 11 receives a television signal. The tuner 12 demodulates the received television signal and outputs the demodulated signal as an encoded digital video signal.

The decoder 13 performs a predetermined decoding process (such as an MPEG (Moving Picture Experts Group) decoding process) on the input digital video signal (for example, a digital video signal D1 input from the tuner and a digital video signal D2 input from a not-shown recording medium or the like), thereby generating an image signal Din (a video signal and a brightness signal), and outputs the image signal Din.

The image processing section 14 performs a predetermined image process on the video signal Din supplied from the decoder 13, thereby generating a video signal Dout subjected to the image process. Concretely, the image processing section 14 has a sharpness processing section 141, a contrast converting section 142, a filter processing section 143, an I/P converting section 144, and an overdrive processing section 145. The processing sections included in the image processing section 14 are not limited to the above sections. Another processing section may be included. Any of the processing sections may be replaced with another processing section.

The sharpness processing section 141 performs a process of emphasizing a contour (edge) or the like (sharpness process) on an input video signal.

The contrast converting section 142 adjusts the brightness level (performs contrast conversion) so as to change the contrast of an input video signal by using a not-shown predetermined γ curve characteristic (which is obtained by associating a tone at the brightness level of the input video signal and a tone at the brightness level of the video signal subjected to the contrast conversion).

The filter processing section 143 performs, for example, using a plurality of tap coefficients for a plurality of pixels in the input video signal, a process of leveling the brightness levels of the plurality of pixels (filter process).

The I/P converting section 144 converts a video signal as an interlace signal to a video signal as a non-interlace signal (progressive signal) (The I/P converting section 144 performs I/P conversion).

The overdrive processing section 145 performs an overdrive process on a video signal in a present field on the basis of the video signal in the present field and a video signal in an immediately preceding field stored in a field memory or the like. The overdrive process is a process of correcting a video signal in a present field so that drive voltage is excessively applied to a display element (for example, a liquid crystal element) of each of the pixels in the display section 16 which will be described later. At the time of performing the overdrive process, a predetermined lookup table (for example, a table in which the tone at the brightness level of the video signal in the immediately preceding field, the tone at the brightness level of the video signal in the present field, and an overdrive amount are associated) is used.

The image processing section 14 changes the degree of an image process on the video signal Din (for example, the degree of the sharpness process performed by the sharpness processing section 141, the degree of a change in the γ curve (contrast conversion) performed by the contrast converting section 142, the value of the tap coefficient (the degree of the filtering process) in the filter processing section 143, the degree of conversion intensity of the I/P conversion performed by the I/P converting section 144, and an overdrive amount in the overdrive process performed by the overdrive processing section 145) in accordance with a result Jout of discriminating a signal source (film source) of the video signal Din supplied from the signal discriminating section 15 which will be described later. Consequently, as the details will be described later, a proper image process may be performed in accordance with the signal source of the video signal Din.

The signal discriminating section 15 discriminates the signal source of the video signal Din supplied from the decoder 13 and outputs the signal source discrimination result Jout to the image processing section 14. The details of the signal discriminating section 15 will be described later.

The display section 16 displays an image on the basis of image data output from the image processing section 14. The display section 16 includes, for example, an OLED (Organic Light-Emitting Diode), an LCD (Liquid Crystal Display), a PDP (Plasma Display Panel), and the like.

Next, the configuration of the signal discriminating section 15 will be described in detail with reference to FIGS. 2 to 6 in addition to FIG. 1.

The signal discriminating section 15 has, as shown in FIG. 1, data store sections 151A and 151B, a pattern generating section 152, a pattern analyzing section 153, a main discriminating section 154, and an analysis control section 155.

Figure 2A:
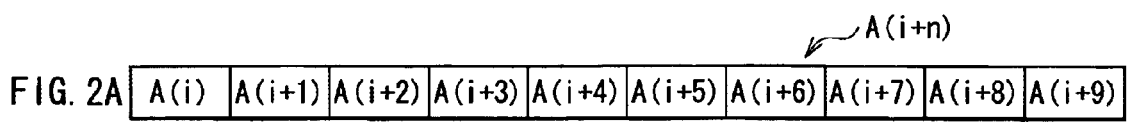
FIGS. 2A and 2B are schematic diagrams showing examples of the data structure of a parameter stored in a data storage illustrated in FIG. 1.
Figure 2B:
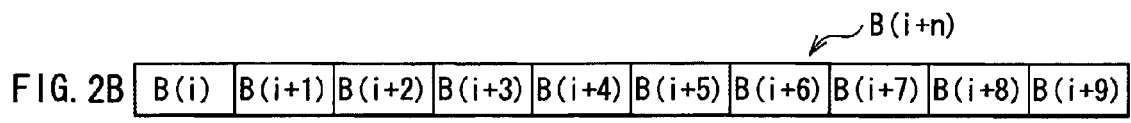

For example, as shown in FIG. 2A, the data store section 151A stores motion magnitudes (for example, sum absolute difference or mean absolute difference) each between one preceding field and one subsequent field which are adjacent to each other in the video signal Din by predetermined number of fields. Concretely, for example, motion magnitudes A(i) to A(i+9) each between adjacent one preceding field and one subsequent field, of ten fields are stored. Similarly, as shown in FIG. 2B, the data store section 151B stores motion magnitudes (for example, sum absolute difference or mean absolute difference) each between two preceding fields and two subsequent fields which are adjacent to each other in the video signal Din by predetermined number of fields. Concretely, for example, motion magnitudes B(i) to B(i+9) each between adjacent two preceding fields and two subsequent fields, of ten fields are stored.

The pattern generating section 152 generates a pattern of a motion magnitude between one preceding field and one subsequent field and a pattern of a motion magnitude between two preceding fields and two subsequent fields (generically called motion magnitude pattern p(i+n)), having a pattern structure according to a signal source, and outputs the motion magnitude pattern to the pattern analyzing section 153. Concretely, a plurality of motion magnitude patterns p(i+n) are obtained in correspondence with a plurality of signal sources. In addition, a motion magnitude pattern corresponding to a typical (regular) signal source (film source) and a motion magnitude pattern corresponding to an irregular signal source (film source) are obtained.

More concretely, for example, with respect to a normal 2-3 film source, the following motion magnitude pattern p(i+n) is obtained. Specifically, a normal 2-3 film source is expressed by a field string as shown by the following expression (1) by pull-down process. In the expression (1), each of "A", "B", "C", . . . expresses video images of the same frame. The suffix "o" expresses an odd field, and the suffix "e" expresses an even field. In the following, the same expressions are used. In this case, a pattern of a motion magnitude between two preceding fields and two subsequent fields with respect to the normal 2-3 film source is expressed by, for example, the following expression (2). In the expression (2), "*" expresses an arbitrary value. In the following, the same expression is used. Similarly, a pattern of a motion magnitude between one preceding field and one subsequent field with respect to the normal 2-3 film source is expressed by, for example, the following expression (3). In the expression (3), "B" indicates that the value is larger than a value of the immediately preceding field. "S" indicates that the value is smaller than the value of the immediately preceding field. In the following, the same expression is used. Although not shown in the expression (3), "E" indicates that the value is equal to the value of the immediately preceding field. "MB" indicates a value equal to or larger than the value of the immediately preceding field. "MS" indicates a value equal to or smaller than the value of the immediately preceding field.

$$Ao, Ae, Ao, Be, Bo, Ce, Co, Ce, Do, De, \quad (1)$$

$$*, *, 0, *, *, *, *, 0, *, *, \quad (2)$$

$$B, S, S, B, S, B, S, S, B, S, \quad (3)$$

With respect to a normal 3-2-3-2-2 film source, the following motion magnitude pattern p(i+n) is obtained. Specifically, a normal 3-2-3-2-2 film source is expressed by a field string as shown by the following expression (4). In this case, a pattern of a motion magnitude between two preceding fields and two subsequent fields with respect to the normal 3-2-3-2-2 film source is expressed by, for example, the following expression (5).

$$Ao, Ae, Ao, Be, Bo, Ce, Co, Ce, Do, De, Eo, Ee, \quad (4)$$

$$*, *, 0, *, *, *, *, 0, *, *, *, *, \quad (5)$$

With respect to a normal 2-3-3-2 film source, the following motion magnitude pattern p(i+n) is obtained. Specifically, a normal 2-3-3-2 film source is expressed by a field string as shown by the following expression (6). In this case, a pattern of a motion magnitude between two preceding fields and two subsequent fields with respect to the normal 2-3-3-2 film source is expressed by, for example, the following expression (7).

$$Ao, Ae, Bo, Be, Bo, Ce, Co, Ce, Do, De, \quad (6)$$

$$*, *, *, *, 0, *, *, 0, *, *, \quad (7)$$

With respect to a normal 2-2 film source, the following motion magnitude pattern p(i+n) is obtained. Specifically, a normal 2-2 film source is expressed by a field string as shown by the following expression (8). In this case, a pattern of a motion magnitude between one preceding field and one subsequent field with respect to the normal 2-2 film source is expressed by, for example, the following expression (9).

$$Ao, Ae, Bo, Be, Co, Ce, Do, De, \quad (8)$$

$$B, S, B, S, B, S, B, S, \quad (9)$$

Figure 3:
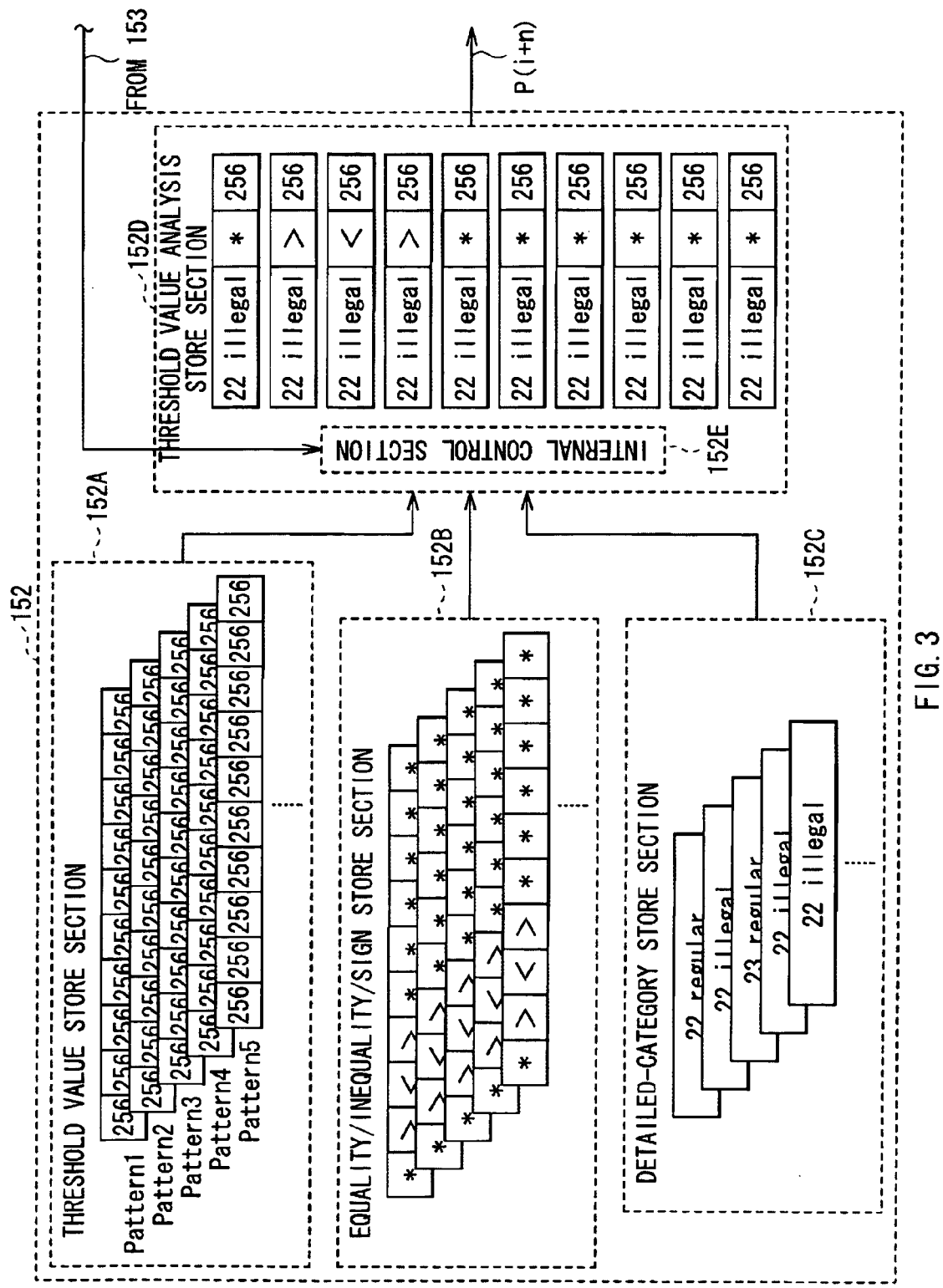
FIG. 3 is a block diagram showing a detailed configuration of a pattern generator illustrated in FIG. 1.

The pattern generating section 152 has, for example, as shown in FIG. 3, a threshold value store section 152A, an equality/inequality sign store section 152B, a detailed-category store section 152C, a threshold value analysis store section 152D, and an internal control section 152E.

The threshold value store section 152A stores threshold values for comparing the values of the motion magnitudes A(i) to A(i+9) between two consecutive fields or the motion magnitudes B(i) to B(i+9) between two fields with one field in between and the motion magnitude pattern p(i+n) on the field-by-field unit basis. In the threshold value store section 152A, a plurality of threshold values corresponding to a plurality of signal sources are stored.

The equality/inequality sign store section 152B stores data of equality sign or inequality sign as a sign indicative of the relation between the value of the motion magnitudes A(i) to A(i+9) between two consecutive fields or the motion magnitudes B(i) to B(i+9) between two fields with one field in between and the motion magnitude pattern p(i+n) on the field-by-field unit basis. In the equality/inequality sign store section 152B, data of a plurality of equality/inequality signs corresponding to a plurality of signal sources is stored.

The detailed-category store section 152C stores information of a detailed category of a signal source (in this case, attribute information of the signal source). As shown in FIG. 3, examples of the attribute information of such a signal source are "22 regular" indicative of a normal 2-2 film source, "22 illegal" indicative of an irregular 2-2 film source, "23 regular" indicative of a normal 2-3 film source, and "23 illegal" indicative of an irregular 2-3 film source.

The threshold value analysis store section 152D constructs, for example, a motion magnitude pattern p(i+n) as shown in FIG. 3 on the basis of the threshold value supplied from the threshold value store section 152A, data of an equality/inequality sign supplied from the equality/inequality sign store section 152B, and the attribute information of the signal source supplied from the detailed-category store section 152C. The constructed motion magnitude pattern p(i+n) is output to the pattern analyzing section 153.

On the basis of a request from the pattern analyzing section 152, the internal control section 152E takes data according to the request from the threshold value store section 152A, the equality/inequality sign store section 152B, and the detailed-category store section 152C, and supplies it to the threshold value analysis store section 152D.

The pattern analyzing section 153 compares the motion magnitudes A(i) to A(i+9) between two consecutive fields supplied from the data store section 151A and the motion magnitudes B(i) to B(i+9) between two fields with one field in between supplied from the data store section 151B with the motion magnitude pattern p(i+n) supplied from the pattern generating section 152 to obtain the degree of match or mismatch between the motion magnitudes A(i) to A(i+9) and the motion magnitudes B(i) to B(i+9) and the motion magnitude pattern p(i+n). The obtained degree of match or mismatch is output as analysis result data Aout to the main discriminating section 154.

Figure 4:
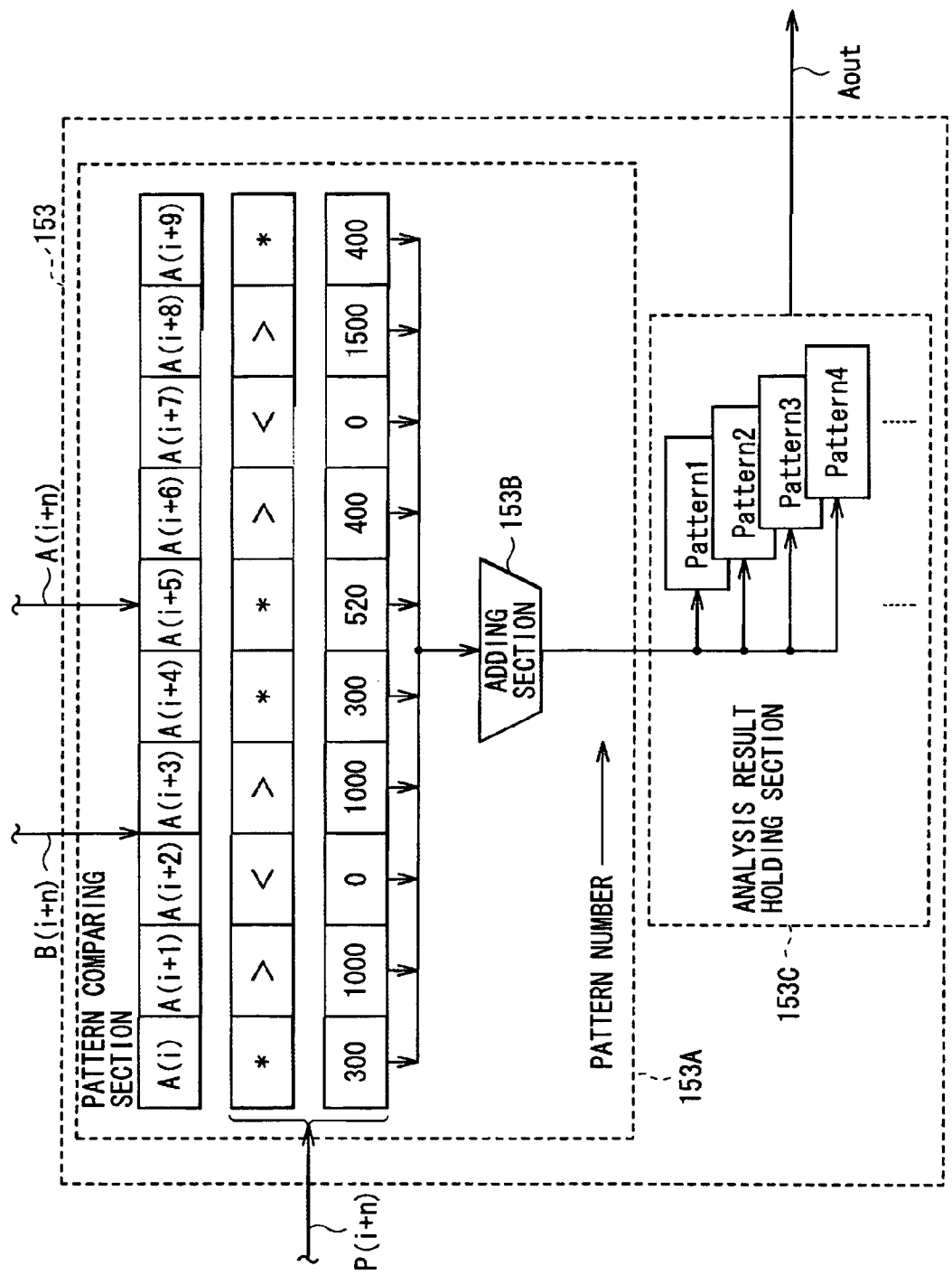
FIG. 4 is a block diagram showing a detailed configuration of a pattern analyzer illustrated in FIG. 1.

The pattern analyzing section 153 has, for example, as shown in FIG. 4, a pattern comparing section 153A, an adding section 153B, and an analysis result store section 153C.

The pattern comparing section 153A performs pattern matching between the motion magnitudes A(i) to A(i+9) and the motion magnitudes B(i) to B(i+9) and the motion magnitude pattern p(i+n) by using the threshold value of the motion magnitude included in the motion magnitude pattern p(i+n) and the data of the equality or inequality sign, to obtain whether they match or mismatch field by field. In the case where a plurality of motion magnitude patterns p(i+n) exist in correspondence with signal sources, such pattern matching is performed on each of the motion magnitude patterns p(i+n).

The adding section 153B adds the matches or mismatches on the field unit basis obtained in the pattern comparing section 153A, thereby obtaining the degree of match (the number of matched fields) or the degree of mismatch (the number of mismatched fields) in an amount of the predetermined number of fields (an amount of 10 fields).

The analysis result holding section 153C holds the degree of match or the degree of mismatch obtained by the pattern comparing section 153A and the adding section 153B, and outputs the degree of match or the degree of mismatch as the analysis result data Aout. In the case where a plurality of motion magnitude patterns p(i+n) exist in correspondence with the signal sources, as shown in FIG. 5, the degree of match or the degree of mismatch is held for each of the motion magnitude patterns p(i+n) (that is, for each of the signal sources).

The main discriminating section 154 discriminates the signal source of the video signal Din on the basis of the analysis result data Aout (the degree of match or the degree of mismatch) supplied from the pattern analyzing section 153 in consideration of the degree of certainty or the degree of uncertainty in the discrimination. In the case where a plurality of motion magnitude patterns p(i+n) exist in correspondence with the signal sources, the video signals Din of the plurality of signal sources are discriminated simultaneously on the basis of a plurality of the degrees of match or the degrees of mismatch included in the analysis result data Aout. Concretely, a weighting process which will be described later is performed on the plurality of degrees of match or the plurality of degrees of mismatch. After performing the weighting process, the degree of certainty or the degree of uncertainty is calculated. A result of such discrimination of the signal source of the video signal Din is output as discrimination result data Jout to the image processing section 14.

Figure 5:
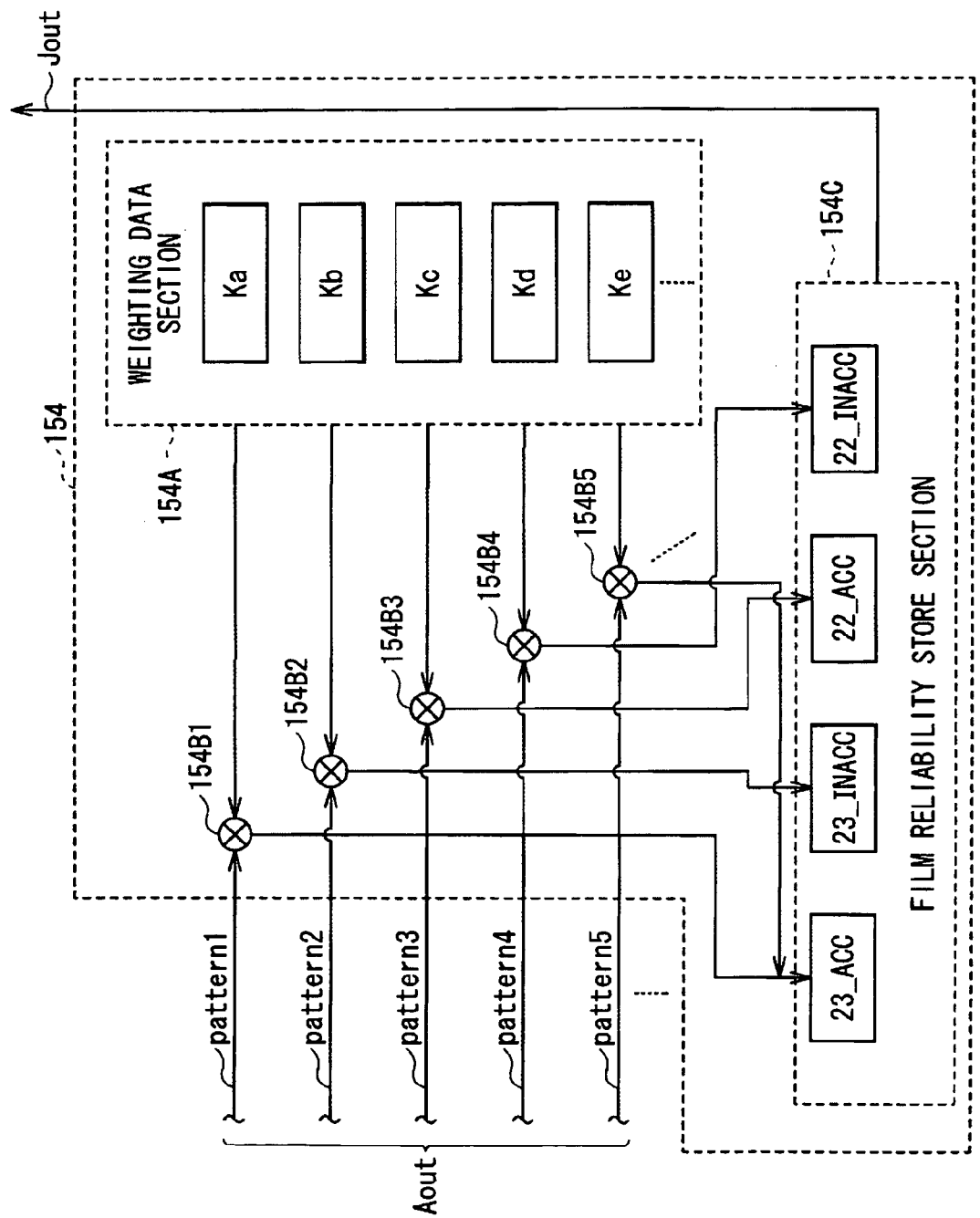
FIG. 5 is a block diagram showing a detailed configuration of a main discriminating section illustrated in FIG. 1.

The main discriminating section 154 has, for example, as shown in FIG. 5, a weighting data section 154A, multiplying sections 154B1 to 154B5 and the like, and a film reliability store section 154C.

The weighting data section 154A stores weighting data used in the weighing process on the plurality of degrees of match or the degrees of mismatch (concretely, a plurality of weighting coefficients Ka to Ke and the like corresponding to the signal sources). The weighting coefficients Ka to Ke and the like have values different from each other in accordance with the kinds and the like of HD (High Definition) signals (1080i, 720p, and the like), SD (Standard Definition) signals (480i, 480p, and the like), regular signals, irregular signals, and signal sources (film sources). It is also possible to provide a not-shown setting section so that the user can freely set the weighting coefficients Ka to Ke and the like.

Each of the multipliers 154B1 to 154B5 and the like multiplies the degree of match or mismatch (for example, patterns 1 to 5 in FIG. 5) of each of the signal sources included in the analysis result data Aout supplied from the analysis result holding section 153C with the weighting coefficients Ka to Ke and the like supplied from the weighting data section 154A, and outputs multiplication values to the film reliability store section 154C.

The film reliability store section 154C stores an index showing the degree of certainty or uncertainty of discrimination for each of signal sources, and outputs the indexes as the discrimination result data Jout to the image processing section 14. Concretely, a multiplication result of the multiplying section 154B1 and that of the multiplying section 154B5 are added and the result is stored as the degree ("23_ACC" in FIG. 5) in a 2-3 film source which seems to be certain. A multiplication result of the multiplying section 154B2 is stored as the degree ("23_INACC" in FIG. 5) in a 2-3 film source which seems to be uncertain. A multiplication result of the multiplying section 154B3 is stored as the degree ("22_ACC" shown in FIG. 5) of a 2-2 film source which seems to be certain. A multiplication result of the multiplying section 154B4 is stored as the degree ("22_INACC" shown in FIG. 5) of a 2-2 film source which seems to be uncertain.

The analysis control section 155 controls the operation of the pattern analyzing section 153. Concretely, a condition is set and, only in the case where the condition is satisfied, the operation of the pattern analyzing section 153 is stopped. To the analysis control section 155, parameter data Da and Db (for example, an average value of brightness values in frames) obtained from the image processing section 14 is input via the data store sections 151A and 151B and the pattern analyzing section 153.

Figure 6:
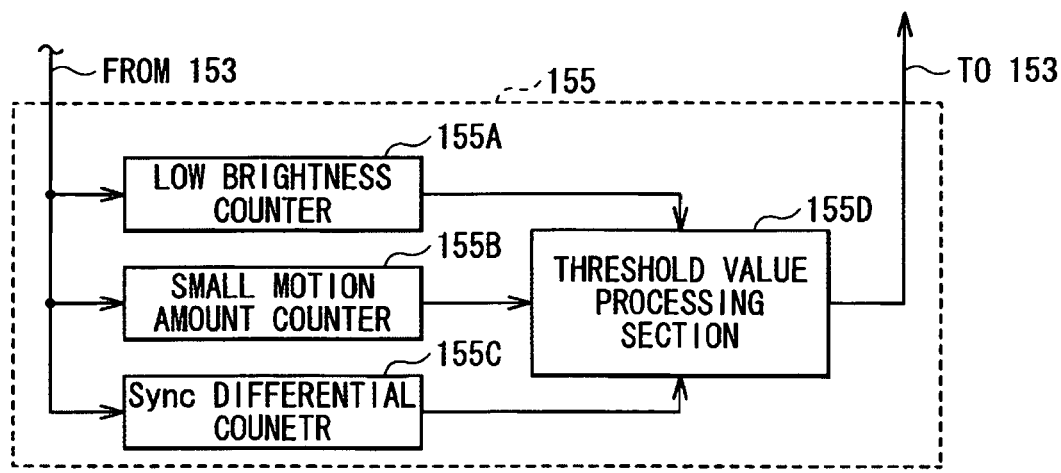
FIG. 6 is a block diagram showing a detailed configuration of an analysis controller illustrated in FIG. 1.

The analysis control section 155 has, for example, as shown in FIG. 6, a low-brightness counter 155A, a small motion magnitude counter 155B, a sync differential counter 155C, and a threshold value processing section 155D.

The low-brightness counter 155A counts the number of fields of a predetermined brightness threshold value or less in the video signal Din by using the parameter data Da and Db obtained from the image processing section 14 to determine the degree of low brightness (non-detection limit) in the video signal Din.

The small motion magnitude counter 155B counts the number of fields of the predetermined motion threshold value or less in the video signal Din by using the motion magnitudes A(i) and B(i) obtained from the pattern analyzing section 153 to determine the degree of the small motion magnitudes in the video signal Din.

The sync differential counter 155C determines whether the data of the motion magnitudes A(i) and B(i) between the video signals Din is periodically obtained or not.

The threshold value processing section 155D controls execution or stop of the operation of the pattern analyzing section 153 on the basis of determination results of the low-brightness counter 155A, the small motion magnitude counter 155B, and the sync differential counter 155C. Concretely, when the degree of low brightness in the video signal Din is high, the degree of the small motion magnitude in the video signal Din is high, or the data of the motion magnitudes A(i) and B(i) is not periodically obtained, the operation of the pattern analyzing section 153 is stopped.

The data store section 151A corresponds to a concrete example of a "first store section" in the present invention. The data store section 151B corresponds to a concrete example of a "second store section" in the present invention. The pattern analyzing section 153 corresponds to a concrete example of a "comparing section" in the present invention. The main discriminating section 154 corresponds to a concrete example of a "discriminating section" in the present invention. The detailed-category store section 152C corresponds to a concrete example of an "attribute store section" in the present invention. The analysis result holding section 153C corresponds to a concrete example of a "comparison result store section" in the present invention. The small motion magnitude counter 155B corresponds to a concrete example of a "small motion magnitude determining section" in the present invention. The low brightness counter 155A corresponds to a concrete example of a "low brightness determining section" in the present invention. The sync differential counter 155C corresponds to a concrete example of a "cycle determining section" in the present invention. The threshold value processing section 155D corresponds to a concrete example of an "operation processing section" in the present invention.

Next, with reference to FIGS. 7 to 9 in addition to FIGS. 1 to 6, the operation of the TV device 1 of the embodiment will be described in detail.

In the TV device 1, a television signal D1 transmitted from the outside is received by the antenna 11 and is demodulated by the tuner 12, thereby generating an encoded digital video signal. The encoded digital video signal D1 and the digital video signal D2 obtained from a not-shown recording medium or the like are decoded by the decoder 13, thereby generating image data (video signal) Din. The signal source of the video signal Din is discriminated by the signal discriminating section 15, and the discrimination result Jout is output to the image processing section 14. On the other hand, the image processing section 14 performs a predetermined image process on the video signal Din and the video signal Dout subjected to the image process is generated. According to the discrimination result Jout obtained from the signal discriminating section 15, the degree of image process on the video signal Din is adjusted. In the display section 16, an image based on the video signal Dout subjected to the image process in the image processing section 14 is displayed.

Figure 7:
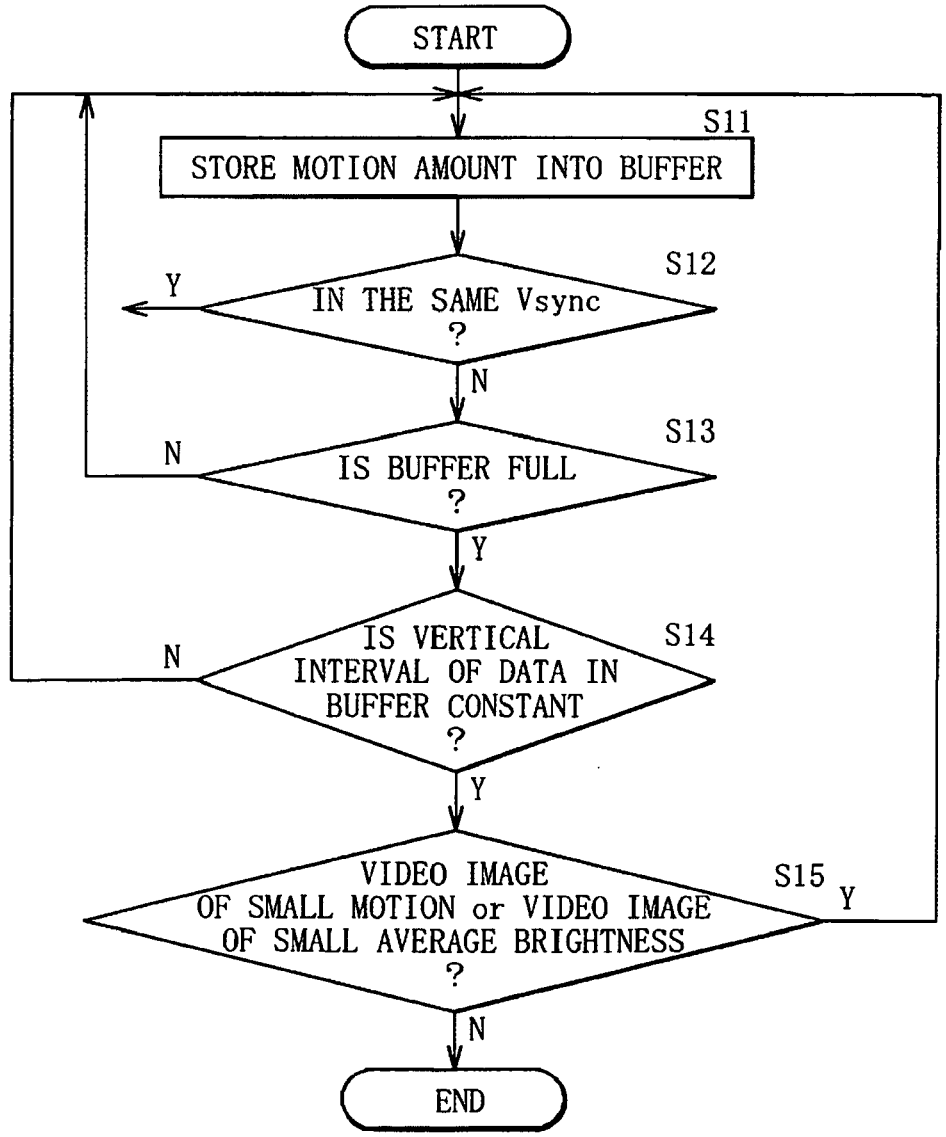
FIG. 7 is a flowchart showing an example of pre-process at the time of performing a process of discriminating a signal source in the image display device illustrated in FIG. 1.
Figure 9:
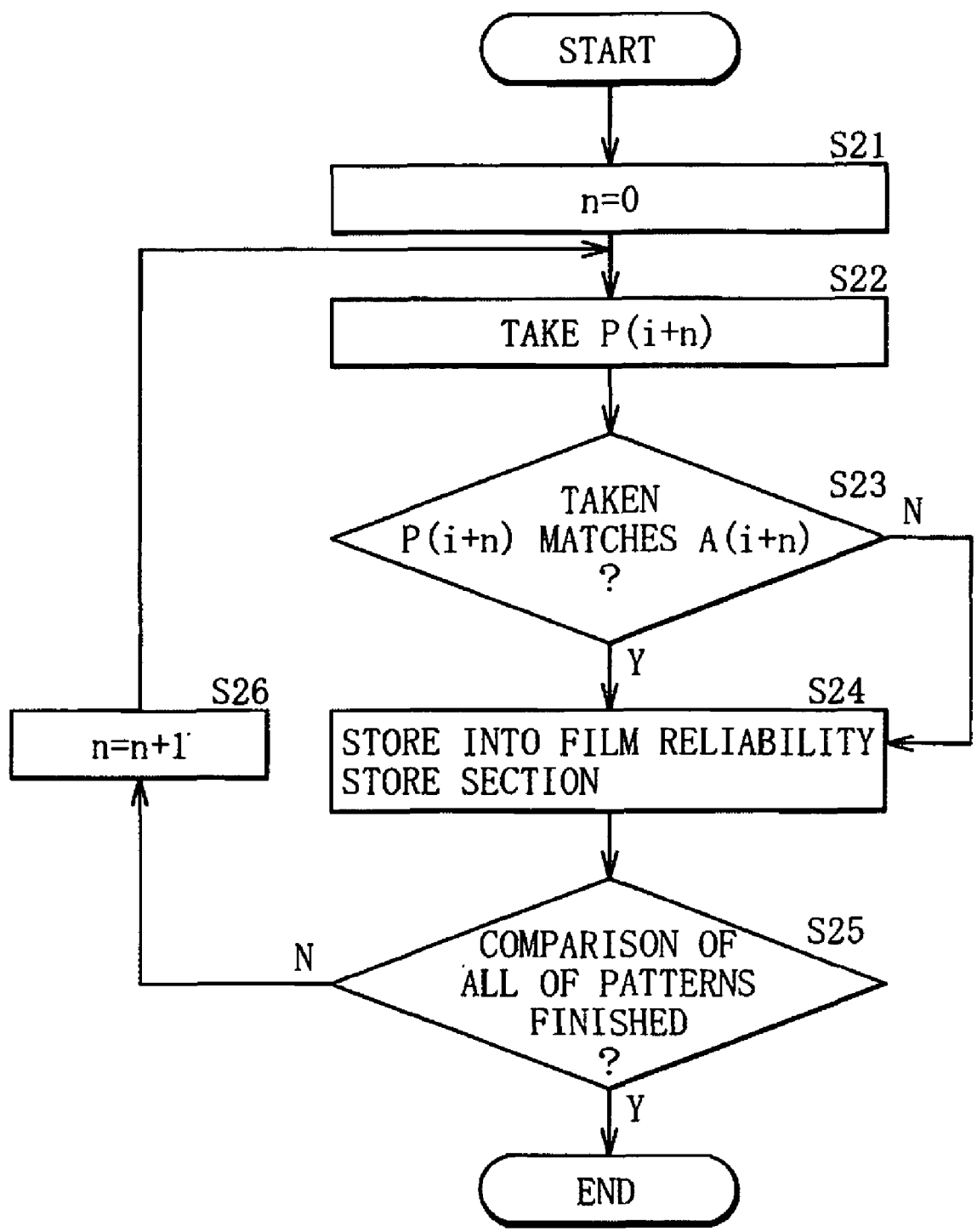
FIG. 9 is a flowchart showing an example of a main process at the time of performing a process of discriminating a signal source in the image display device illustrated in FIG. 1.

The signal discriminating section 15 of the embodiment performs the process of discriminating the video signal Din (concretely, the process of discriminating the signal source of the video signal Din) as shown in, for example, FIGS. 7 to 9. FIG. 7 is a flowchart showing an example of pre-process of the signal source discriminating process. FIG. 9 is a flowchart showing an example of the main process of the signal source discriminating process.

First, the pre-process shown in FIG. 7 is particularly necessary in the case of performing discrimination by software. Specifically, in the case of a multitask program or the like, depending on the priority, the timing of discriminating the video signal Din may be not constant. Therefore, to discriminate the video signal Din with high precision even in such a case, it is preferable to perform the pre-process which will be described below in the signal discriminating section 15.

In the pre-process, concretely, the motion magnitudes A(i) and B(i) between the video signals Din are stored in the buffers in the data store sections 151A and 151B (step S11). Next, whether the stored motion magnitudes A(i) and B(i) are in the same VSync (field) or not (that is, whether they are data of correct motion magnitudes or not) is determined (step S12). In the case where it is determined that the motion magnitudes A(i) and B(i) are in the same VSync (field) (Y in step S12), to obtain the data of the correct motion magnitudes, the program returns again to step S11. On the other hand, when it is determined that the motion magnitudes A(i) and B(i) are not in the same VSync (N in step S12), whether the buffer is full or not (that is, whether data of a motion magnitude of a field used for discrimination is stored or not) is determined (step S13). In the case where it is determined that the buffer is not full (N in step S13), to obtain data of a motion magnitude of the next field, the program returns to step S11. On the other hand, when it is determined that the buffer is full (Y in step S13), whether the vertical interval of data in the buffer is constant or not (that is, whether the data of the motion magnitudes A(i) and B(i) is periodically inputted or not) is determined in the analysis control section 155 (step S14). In the case where it is determined that the vertical interval of data in the buffer is not constant (N in step S14), the program returns to step S11 in order to obtain the data of the motion magnitude again. On the other hand, in the case where it is determined that the vertical interval of data in the buffer is constant (Y in step S14), next, whether a video image has a small motion or not (that is, the degree of a small motion magnitude in the video signal Din is large or not) and whether a video image has small average brightness or not (that is, whether the degree of low-brightness in the video signal Din is high or not) is determined by the analysis control section 155 (step S15). In the case where it is determined that the video image has little motion or has low average brightness (Y in step S15), the main process shown in FIG. 9 is not performed, and the program returns again to step S11. On the other hand, in the case where it is determined that the image is not an image having little motion or an image having low average brightness (N in step S15), the pre-process is finished, and the program advances to the main process shown in FIG. 9.

Only when the motion magnitudes A(i+n) and B(i+n) stored in the buffers in the data store sections 151A and 151B are in a state as shown in FIG. 8 by performing the pre-process shown in FIG. 7 in such a manner, the following main process is performed. Consequently, the video signal Din is determined with high precision. In FIG. 8, Vsync at an arbitrary timing is expressed as "v".

Next, in the main process shown in FIG. 9, first, "n" indicative of the position of a field in the motion magnitudes A(i+n), B(i+n), and the motion magnitude pattern p(i+n) is set to the initial value "0" (step S21). After that, the pattern analyzing section 153 obtains the motion pattern p(i+n) generated by the pattern generating section 152 (step S22). In the pattern analyzing section 153, the motion magnitudes A(i+n) and B(i+n) are compared with the motion magnitude pattern p(i+n) in the present field, and whether the value of the motion magnitude matches the pattern or not (step S23). On the basis of the obtained degree of match or mismatch, the degree of certainty or uncertainty of the discrimination is stored in the film reliability store section 154C (step S24). Whether the comparison between the motion magnitudes A(i+n) and B(i+n) and the motion magnitude pattern p(i+n) is finished in all of fields in a set field interval or not is determined (step S25). In the case where it is determined that the comparison has not been finished in all of the fields (N in step S25), "1" is added to the value "n" (n=n+1) (step S26), and the program returns again to step S22. On the other hand, when it is determined that the comparison has been finished in all of the fields (Y in step S25), the main process is finished.

In the main process shown in FIG. 9, the degree of match or mismatch between the motion magnitudes A(i) and B(i) between the video signals Din in two fields which are different from each other along the time base and the motion magnitude pattern p(i) specified according to the signal source is obtained. On the basis of the degree of match or mismatch obtained, the signal source of the video signal Din is discriminated in consideration of the degree of certainty or uncertainty of discrimination. Consequently, as compared with the method in related art of discriminating only the signal source of the video signal as, for example, "a 2-3 film source", "a 2-2 film source", or the like, the flexibility in discrimination of the signal source of the video signal Din increases.

The field interval used for the discriminating process may be set arbitrarily. For example, in the case where a field interval is set to be long, the discrimination result data Jout becomes a stable value, but it may be impossible to address a sudden change in the signal source. On the other hand, in the case where the field interval is set to be short, such a sudden change in the signal source may be addressed, but fluctuations in the value of the discrimination result data Jout become large.

As described above, in the embodiment, the pattern analyzing section 153 in the signal discriminating section 15 obtains the degree of match or the degree of mismatch between the motion magnitudes A(i) and B(i) between the video signals Din and the motion magnitude pattern p(i). On the basis of the degree of match or the degree of mismatch obtained, the main discriminating section 154 discriminates the signal source of the video signal Din in consideration of the degree of certainty or the degree of uncertainty of discrimination. Consequently, the flexibility at the time of discriminating the signal source of the video signal Din is made higher than that in the technique of related art. Therefore, signal discrimination enabling more appropriate signal process according to the signal source of the video signal Din is realized.

To be concrete, according to the discrimination result Jout of the signal source of the video signal Din supplied from the signal discriminating section 15, the image processing section 14 changes the degree of image process on the video signal Din (for example, the degree of sharpness process by the sharpness processing section 141, the degree of a change in the γ curve (contrast conversion) by the contrast converting section 142, the value of the tap coefficient (the degree of filter process) of the filter processing section 143, the degree of strength of I/P conversion of the I/P converting section 144, the overdrive amount in the overdrive process performed by the overdrive process 145, and the like). Thus, the image process which is more appropriate than that in the technique of related art may be performed in accordance with the signal source of the video signal Din.

A plurality of motion magnitude patterns p(i) are provided in correspondence with a plurality of signal sources, and the motion magnitudes A(i) and B(i) between the video signals Din are compared with the plurality of motion magnitude patterns p(i) to obtain a plurality of degrees of match or mismatch corresponding to the plurality of signal sources. Therefore, on the basis of the plurality of degrees of match or mismatch, the video signals Din of the plurality of signal sources may be discriminated simultaneously.

The main discriminating section 154 performs weighting process on the obtained plurality of degrees of match or mismatch and, after performing the weighting process, calculates the degree of certainty or the degree of uncertainty. Consequently, the video signal Din is discriminated more appropriately according to the degrees of importance of the plurality of signal sources. Therefore, more appropriate image process is performed on the video signal Din.

Although the present invention has been described above by the embodiment, the invention is not limited to the embodiment but can be variously modified.

For example, in the foregoing embodiment, the case where the signal discriminating section 15 discriminates the signal source (the kind of the film source) of the video signal Din has been described. The object to be discriminated of the signal discriminating device of the present invention is not limited to the above. For example, discrimination of a state of the video signal Din (for example, discrimination between a still image and a moving image, discrimination between a dark scene and a light scene, discrimination between a full black display mode and a full white display mode, or the like) may be performed. In the foregoing embodiment, the case of obtaining the degree of match or the degree of mismatch between the motion magnitudes A(i) to A(i+9) and the motion magnitudes B(i) to B(i+9) between the video signals Din in two fields which are different from each other along the time base and the motion magnitude patterns p(i+n) specified according to signal sources has been described. In the signal discriminating device, by comparing a parameter obtained from signals different from each other in time or space in the video signal Din with a predetermined pattern specified in correspondence with the parameter, the degree of match or the degree of mismatch between a parameter obtained from the video signal Din and the pattern may be obtained. That is, more generally, the signal discriminating device of the present invention may obtain the degree of match or the degree of mismatch between the parameter obtained as described above and the pattern and, on the basis of the obtained degree of match or mismatch, discriminate the state of a video signal in consideration of the degree of certainty or the degree of uncertainty of discrimination. In such a configuration, the flexibility in discrimination of the state of a video signal is made higher as compared with that in the technique of related art, and signal discrimination enabling more appropriate signal process according to the state of the video signal is realized.

Some examples of the method of discriminating the state of the video signal Din in the above manner will be described.

(I) Discrimination of State of Still Image and Moving Image in Video Signal Din

In the case of using a motion magnitude between two consecutive fields as the parameter A(i) stored in the data store section 151A in a manner similar to the foregoing embodiment and using a motion magnitude between two fields with one field in between as the parameter B(i) stored in the data store section 151B in a manner similar to the foregoing embodiment, the following discriminations may be performed.

Discrimination of Still Scene

The threshold value store section 152A stores a threshold value of a motion magnitude (for example, about 100) which is small enough to regard a scene as a still scene on the field unit basis. The equality/inequality sign store section 152B stores an inequality sign "< (less-than sign)" field by field. That is, in each field, whether the conditional equation "parameter A(i)<pattern p(i)" is satisfied or not is determined. For example, in the case where the conditional equation is satisfied in all of 10 fields, the image is determined as a complete still image. For example, even in the case where the conditional equation is not satisfied in all of 10 fields, the image may be determined as a still image with ambiguity (for example, when the conditional equation is satisfied in 80 percent of the fields).

Discrimination of Scene of Strenuous Motion

The threshold value store section 152A stores a threshold value of a motion magnitude (for example, about 1000) which is large enough to regard a scene as a moving scene on the field unit basis. The equality/inequality sign store section 152B stores an inequality sign ">(greater-than sign)" field by field. That is, in each field, whether the conditional equation "parameter A(i)>pattern p(i)" is satisfied or not is determined. For example, in the case where the conditional equation is satisfied in all of 10 fields, the image is determined as a complete strenuous image. For example, even in the case where the conditional equation is not satisfied in all of 10 fields, the image may be determined as an image having strenuous motion with ambiguity (for example, when the conditional equation is satisfied in 80 percent of the fields).

Detection of Flashing (Unpleasant Image Whose Brightness Changes Frame by Frame)

The threshold value store section 152A alternately stores the threshold value (for example, about 100) of a sufficiently small motion magnitude and the threshold value (for example, about 1000) of a sufficiently large motion magnitude on the field unit basis. The equality/inequality sign store section 152B alternately stores the inequality sign "<" and the inequality sign ">" on the field unit basis. That is, whether the conditional equation of "parameter A(i)<pattern p(i)" and the conditional equation of "parameter A(i)>pattern p(i)" are alternately satisfied field by field is determined. On the basis of the degree of satisfaction of the conditional equations, flashing may be detected.

(II) Discrimination of State of Dark Image and Light Image in Video Signal Din

In the case of using an average value of a brightness value of an entire frame (brightness average value) as the parameter A(i) stored in the data store section 151A, the following discriminations may be performed.

Discrimination of Dark Scene

The threshold value store section 152A stores a threshold value of a brightness average value which is small enough to regard a scene as a dark scene on the frame unit basis (for example, about 30 in the case where the brightness value is made of eight bits (256 shades of gray)). The equality/inequality sign store section 152B stores an inequality sign "< (less-than sign)" frame by frame. That is, in each frame, whether the conditional equation "parameter A(i)<pattern p(i)" is satisfied or not is determined. On the basis of the degree of satisfaction of the conditional equation, a dark scene may be detected.

Discrimination of Light Scene

The threshold value store section 152A stores a threshold value of a brightness average value which is large enough to regard a scene as a light scene on the frame unit basis (for example, about 200 in the case where the brightness value is made of eight bits (256 shades of gray)). The equality/inequality sign store section 152B stores an inequality sign "> (greater-than sign)" frame by frame. That is, in each frame, whether the conditional equation "parameter A(i)>pattern p(i)" is satisfied or not is determined. On the basis of the degree of satisfaction of the conditional equation, a light scene may be detected.

(III) Others

In the case of using a histogram distribution of brightness values of an entire frame as the parameters A(i) and A(j) to be stored in the data store section 151A, more detailed discrimination may be performed. Concretely, by comparing parameters A(i)(j) of a histogram distribution of brightness values with corresponding patterns p(i)(j), a full black display state and a full white display state which is not known in the case of using an average brightness value may be detected.

In the foregoing embodiment, the case of using both of the motion magnitude A(i) between two consecutive fields and a motion magnitude B(i) between two fields with one field in between as motion magnitudes between the video signals Din and using both of the motion magnitude pattern between two consecutive fields and a motion magnitude pattern between two fields with one field in between as the motion magnitude pattern p(i) has been described. Alternatively, for example, one of the motion magnitude A(i) between two consecutive fields and the motion magnitude B(i) between two fields with one field in between may be used, and one of the motion magnitude pattern between two consecutive fields and a motion magnitude pattern between two fields with one field in between may be used. With such a configuration, discrimination may be performed more simply than the discrimination using both of the motion magnitudes and both of the patterns.

The invention is not limited to the kinds of signal sources and the kinds of states of the video signal Din described above but may use other kinds.

Figure 10:
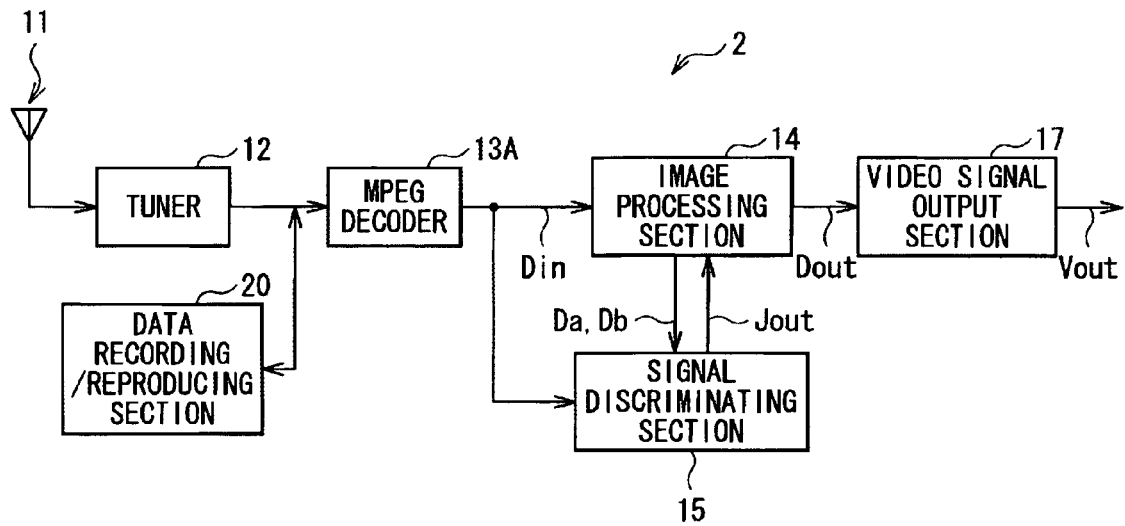
FIG. 10 is a block diagram showing a general configuration of a reproducing device as an embodiment of the present invention.
Figure 11:
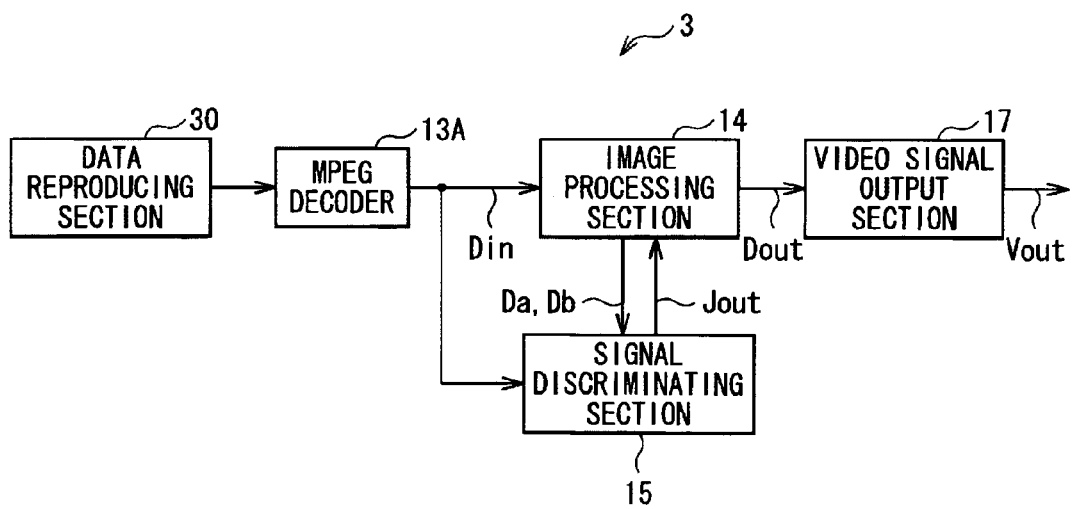
FIG. 11 is a block diagram showing a general configuration of a reproducing device as another embodiment of the present invention.

Further, in the foregoing embodiment, the TV device 1 as the image processing device has been described as an example of applying the signal discriminating device and the signal processing device of the present invention. However, the signal discriminating device and the signal processing device of the present invention can be also applied to, for example, other devices as shown in FIGS. 10 and 11. Concretely, FIG. 10 shows a general block configuration of a reproducing device (a data recoding/reproducing device 2) as an embodiment of the invention. The data recording/reproducing device 2 records and reproduces image data on a recording/reproducing medium such as a DVD (Digital Versatile Disc). The data recording/reproducing device 2 has an antenna 11, a tuner 12, a data recording/reproducing section 20 (corresponding to a concrete example of "reproducing means" in the present invention) for reproducing image data recorded on a recording medium such as a DVD, an MPEG decoder 13A, an image processing section 14 and a signal discriminating section 15 described in the foregoing embodiment, and a video signal output section 17 for outputting a video output signal Vout. FIG. 11 shows a general block configuration of a reproducing device (a data reproducing device 3) as another embodiment of the present invention. The data reproducing device 3 reproduces image data from a recording medium such as a DVD. The data reproducing device 3 has a data reproducing section 30 (corresponding to a concrete example of "reproducing means" in the present invention) for reproducing image data recorded on a recording medium such as a DVD, an MPEG decoder 13A, an image processing section 14 and a signal discriminating section 15 described in the foregoing embodiment, and a video signal output section 17.

It should be understood by those skilled in the art that various modifications, combinations, sub-combinations and alterations may occur depending on design requirements and other factors insofar as they are within the scope of the appended claims or the equivalents thereof.

What is claimed is:

1. A signal discriminating device comprising:
   a comparing section comparing a motion magnitude between two fields of an input video signal with one or more predetermined motion magnitude patterns which are provided in correspondence with one or more signal sources, so as to determine one or more degrees of match or mismatch between the motion magnitude and the motion magnitude patterns; and
   a discriminating section discriminating a signal source of the input video signal in consideration of a degree of certainty or uncertainty of discrimination, the degree of certainty or uncertainty being determined on the basis of the degrees of match or mismatch determined in the comparing section,
   wherein a plurality of motion magnitude patterns are provided in correspondence with a plurality of signal sources, and wherein
   the comparing section compares the motion magnitude with each of the plurality of motion magnitude patterns, so as to determine a plurality of degrees of match or mismatch each corresponding to the plurality of signal sources,
   the discriminating section discriminates, by one operation, the input video signals each corresponding to the plurality of signal sources, on the basis of the plurality of degrees of match or mismatch determined, and
   the discriminating section performs a weighting process by use of weighting coefficients on the plurality of degrees of match or mismatch, and then calculates the degree of certainty or uncertainty based on the plurality of degrees of match or mismatch which are weighted, in which each of the weighting coefficients has a value in accordance with a kind of signal source.

2. The signal discriminating device according to claim 1, wherein the motion magnitude is defined by using a value of a motion magnitude between two consecutive fields, a value of a motion magnitude between two fields with one field in between, or both of them, and the motion magnitude patterns are defined by using motion magnitude patterns between two consecutive fields, motion magnitude patterns between two fields with one field in between, or both of them.

3. The signal discriminating device according to claim 2, further comprising:
   a first store section storing the motion magnitude between two consecutive fields;
   a second store section storing the motion magnitude between two fields with one field in between; and
   a pattern generating section generating the motion magnitude patterns between two consecutive fields and the motion magnitude patterns between two fields with one field in between so that each of the motion magnitude patterns has a pattern structure depending on the corresponding signal source.

4. The signal discriminating device according to claim 3, wherein the motion magnitude patterns between two consecutive fields and the motion magnitude patterns between two fields with one field in between each include a threshold value of the motion magnitude for each field and data indicative of an equality or inequality sign for each field.

5. The signal discriminating device according to claim 4, wherein the pattern generating section comprises:
   a threshold value store section storing the threshold value of the motion magnitude;
   an equality/inequality sign store section storing the data indicative of equality or inequality sign; and
   an attribute store section storing attribute information regarding the signal sources.

6. The signal discriminating device according to claim 5, wherein the threshold value store section stores threshold values of a plurality of motion magnitudes each corresponding to the plurality of signal sources.

7. The signal discriminating device according to claim 5, where the equality/inequality sign store section stores the plurality of data indicative of equality or inequality sign each corresponding to the plurality of signal sources.

8. The signal discriminating device according to claim 4, wherein the comparing section includes:
   a pattern comparing section determining the degree of match or mismatch by performing pattern matching with use of the threshold value of the motion magnitude and the data indicative of equality or inequality sign; and
   a comparison result holding section holding the degree of match or mismatch determined by the pattern comparing section.

9. The signal discriminating device according to claim 1, further comprising a control section controlling operation of the comparing section, and
   the control section includes:
   a small motion magnitude determining section determining the degree of a small motion magnitude in the input video signal through counting the number of fields in the input video signal, the motion magnitudes of the fields being equal to or less than a predetermined motion threshold value;
   a low brightness determining section determining the degree of low brightness in the input video signal through counting the number of fields in the input video signal, brightness of the fields being equal to or less than a predetermined brightness threshold value;
   a cycle watching section watching whether the data of the motion magnitude is periodically obtained or not; and
   an operation processing section controlling execution or halt of operation of the comparing section on the basis of determination results in the small motion magnitude determining section, the low brightness determining section, and the cycle watching section.

10. A signal processing device comprising:
a comparing section comparing a motion magnitude between two fields of an input video signal with one or more predetermined motion magnitude patterns which are provided in correspondence with one or more signal sources, so as to determine one or more degrees of match or mismatch between the motion magnitude and the motion magnitude patterns;
a discriminating section discriminating a signal source of the input video signal in consideration of the degree of certainty or uncertainty of discrimination, the degree of certainty or uncertainty being determined on the basis of the degrees of match or mismatch determined in the comparing section; and
an image processing section performing predetermined image process on the input video signal,
wherein the image processing section changes an image process level on the input video signal in accordance with a result of discrimination of the signal source of the input video signal by the discriminating section,
wherein a plurality of motion magnitude patterns are provided in correspondence with a plurality of signal sources, and wherein
the comparing section compares the motion magnitude with each of the plurality of motion magnitude patterns, so as to determine a plurality of degrees of match or mismatch each corresponding to the plurality of signal sources,
the discriminating section discriminates, by one operation, the input video signals each corresponding to the plurality of signal sources, on the basis of the plurality of degrees of match or mismatch determined, and
the discriminating section performs a weighting process by use of weighting coefficients on the plurality of degrees of match or mismatch, and then calculates the degree of certainty or uncertainty based on the plurality of degrees of match or mismatch which are weighted, in which each of the weighting coefficients has a value in accordance with a kind of signal source.

11. An image display device comprising:
a comparing section comparing a motion magnitude between two fields of an input video signal with one or more predetermined motion magnitude patterns which are provided in correspondence with one or more signal sources, so as to determine one or more degrees of match or mismatch between the motion magnitude and the motion magnitude patterns;
a discriminating section discriminating a signal source of the input video signal in consideration of the degree of certainty or uncertainty of discrimination, the degree of certainty or uncertainty being determined on the basis of the degrees of match or mismatch determined in the comparing section;
an image processing section performing predetermined image process on the input video signal; and
a display section displaying an image on the basis of a video signal subjected to the image process by the image processing section,
wherein the image processing section changes an image process level on the input video signal in accordance with a result of discrimination of the signal source of the input video signal by the discriminating section,
wherein a plurality of motion magnitude patterns are provided in correspondence with a plurality of signal sources, and wherein
the comparing section compares the motion magnitude with each of the plurality of motion magnitude patterns, so as to determine a plurality of degrees of match or mismatch each corresponding to the plurality of signal sources,
the discriminating section discriminates, by one operation, the input video signals each corresponding to the plurality of signal sources, on the basis of the plurality of degrees of match or mismatch determined, and
the discriminating section performs a weighting process by use of weighting coefficients on the plurality of degrees of match or mismatch, and then calculates the degree of certainty or uncertainty based on the plurality of degrees of match or mismatch which are weighted, in which each of the weighting coefficients has a value in accordance with a kind of signal source.

12. A reproducing device comprising:
a reproducing section reproducing a video signal recorded on a predetermined recording medium;
a comparing section comparing a motion magnitude between two fields of an input video signal with one or more predetermined motion magnitude patterns which are provided for one or more signal sources, so as to determine one or more degrees of match or mismatch between the motion magnitude and the motion magnitude patterns, the input video signal being reproduced by the reproducing section;
a discriminating section discriminating a signal source of the input video signal in consideration of the degree of certainty or uncertainty of discrimination, the degree of certainty or uncertainty being determined on the basis of the degrees of match or mismatch determined in the comparing section; and
an image processing section performing predetermined image process on the input video signal,
wherein the image processing section changes an image process level on the input video signal in accordance with a result of discrimination of the signal source of the input video signal by the discriminating section,
wherein a plurality of motion magnitude patterns are provided in correspondence with a plurality of signal sources, and wherein
the comparing section compares the motion magnitude with each of the plurality of motion magnitude patterns, so as to determine a plurality of degrees of match or mismatch each corresponding to the plurality of signal sources,
the discriminating section discriminates, by one operation, the input video signals each corresponding to the plurality of signal sources, on the basis of the plurality of degrees of match or mismatch determined, and
the discriminating section performs a weighting process by use of weighting coefficients on the plurality of degrees of match or mismatch, and then calculates the degree of certainty or uncertainty based on the plurality of degrees of match or mismatch which are weighted, in which each of the weighting coefficients has a value in accordance with a kind of signal source.

* * * * *